(12) United States Patent
Park et al.

(10) Patent No.: US 8,125,556 B2
(45) Date of Patent: Feb. 28, 2012

(54) DEVICE HAVING CAMERA FUNCTION INCLUDING ERROR DETECTION AND DISPLAY METHOD AND MEDIUM THEREFOR

(75) Inventors: Sang-wook Park, Yongin-si (KR); Stanley Chung, Seoul (KR); Sang-ryong Kim, Yongin-si (KR); Chang-su Kim, Suwon-si (KR); Sun-gi Hong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 11/889,624

(22) Filed: Aug. 15, 2007

(65) Prior Publication Data

US 2008/0079811 A1      Apr. 3, 2008

(30) Foreign Application Priority Data

Sep. 29, 2006   (KR) .................. 10-2006-0096404

(51) Int. Cl.
*H04N 5/76* (2006.01)
*H04N 5/222* (2006.01)
(52) U.S. Cl. ............................ 348/333.04; 348/231.3

(58) Field of Classification Search ............... 348/231.3, 348/231.6, 333.01, 333.02, 333.04, 333.05, 348/333.12, 346
See application file for complete search history.

(56) References Cited

U.S. PATENT DOCUMENTS 6,134,644 A    10/2000   Mayuzumi et al.
(Continued)

FOREIGN PATENT DOCUMENTS

JP         8-137647         5/1996
(Continued)

OTHER PUBLICATIONS

PCT Search Report and Written Opinion of the International Searching Authority mailed Dec. 14, 2007.

(Continued)

*Primary Examiner* — Timothy J Henn
(74) *Attorney, Agent, or Firm* — Staas & Halsey LLP

(57) ABSTRACT

When an error occurring in a terminal (device) is detected, one or more solutions for removing the detected error are displayed to a user, so that the detected error can be easily removed by the user even though the user is not familiar with operations or detailed functions of the camera.

27 Claims, 14 Drawing Sheets
(6 of 14 Drawing Sheet(s) Filed in Color)

U.S. PATENT DOCUMENTS

| | | | |
|---|---|---|---|
| 6,154,210 A * | 11/2000 | Anderson | 715/840 |
| 6,539,177 B2 * | 3/2003 | Parulski | 396/287 |
| 7,319,388 B2 | 1/2008 | Ichinowatari | |
| 2005/0134700 A1 | 6/2005 | Shiraishi | |
| 2006/0077266 A1 * | 4/2006 | Nurmi | 348/239 |
| 2006/0098104 A1 * | 5/2006 | Fujii et al. | 348/222.1 |

FOREIGN PATENT DOCUMENTS

| | | |
|---|---|---|
| JP | 2000-194415 | 7/2000 |
| JP | 2002-142148 | 5/2002 |
| JP | 2003-110884 | 4/2003 |
| JP | 2003-125239 | 4/2003 |
| JP | 2004-166075 | 6/2004 |
| JP | 2005-109607 | 4/2005 |
| JP | 2006-91343 | 4/2006 |

OTHER PUBLICATIONS

Japanese Office Action mailed Sep. 20, 2011 in Japanese Patent Application No. 2009-530250.

* cited by examiner

FIG. 2A

| ERROR CATEGORY | SOFTWARE CONDITION | HARDWARE CONDITION | SUGGESTED SOLUTION (AUTOMATIC SETTING OR MESSAGE DISPLAY) | NO. |
|---|---|---|---|---|
| UNABLE TO PHOTOGRAPH | BATTERY LIFE IS INSUFFICIENT | | CHANGE TERMINAL'S MODE TO POWER-SAVING MODE | 1 |
| | LOW BATTERY | | DELETE STORED PHOTOS | 2 |
| | MEMORY IS NOT INITIALIZED | | INITIALIZE MEMORY | 3 |
| | | NO MEMORY CARD | DISPLAY MESSAGE INDICATING "NO MEMORY CARD. PLEASE INSERT THE MEMORY CARD." | 4 |
| | | MEMORY CARD IS LOCKED | DISPLAY MESSAGE INDICATING "MEMORY CARD IS LOCKED. PLEASE UNLOCK MEMORY CARD." | 5 |
| VIBRATION = INSUFFICIENT EXPOSURE | VIBRATION-REDUCTION FUNCTION IS SET TO OFF | | SET VIBRATION-REDUCTION FUNCTION TO ON | 6 |
| | ISO IS SET TO BE LOW | | INCREASE ISO SO THAT A SHUTTER SPEED IS OVER 60, AND IF THE SHUTTER SPEED OVER 60 IS IMPOSSIBLE, MAXIMIZE ISO | 7 |
| | FLASH IS SET TO OFF | | SET FLASH TO ON | 8 |
| UNABLE TO FOCUS | FOCAL LENGTH IS SHORT | | SET A CLOSE-SHOT FUNCTION TO ON | 9 |
| | SUBJECT IS TOO DARK | | TURN ON AN AF ASSIST LIGHT | 10 |
| | | SUBJECT IS NOT WITHIN FOCAL AREA (NO SUBJECT IS FOUND DURING FOCUSING) | DISPLAY MESSAGE INDICATING "LOCATE THE SUBJECT WITHIN A FOCAL AREA." | 11 |
| | | AF ASSIST LIGHT IS BLOCKED OR FAILS TO REACH SUBJECT (AF ASSIST LIGHT IS ON, BUT NO AF ASSIST LIGHT IS DETECTED) | DISPLAY MESSAGE INDICATING "CHECK WHETHER AN AF ASSIST LIGHT IS BLOCKED BY A FINGER, AND IF SO, REMOVE THE FINGER AWAY FROM THE AF ASSIST LIGHT." | 12 |

FIG. 2B

| ERROR CATEGORY | SOFTWARE CONDITION | HARDWARE CONDITION | SUGGESTED SOLUTION (AUTOMATIC SETTING OR MESSAGE DISPLAY) | NO. |
|---|---|---|---|---|
| ABNORMAL EXPOSURE | SUBJECT IS BRIGHT IN COMPARISON WITH BACKGROUND (PHOTOMETRIC MODE IS NOT SPOT MODE) | | SET PHOTOMETRIC MODE TO SPOT MODE | 13 |
| | SUBJECT IS DARK IN COMPARISON WITH BACKGROUND (PHOTOMETRIC MODE IS NOT SPOT MODE) | | SET PHOTOMETRIC MODE TO SPOT MODE | 14 |
| | SUBJECT IS DARK IN COMPARISON WITH BACKGROUND (FLASH IS SET TO OFF) | | SET FILL-IN FLASH ON | 15 |
| | EV IS EXCESSIVELY + (EV MAY ABOVE 0 WHEN EXCESSIVE EXPOSURE) | | DECREASE EV TO OPTIMAL LEVEL | 16 |
| | EV IS EXCESSIVELY - (EV MAY BELOW 0 WHEN INSUFFICIENT EXPOSURE) | | INCREASE EV TO OPTIMAL LEVEL | 17 |
| | | SUBJECT IS LOCATED OUT OF FLASH REACHABLE RANGE WHEN FLASH IS ON (DURING AF MEASUREMENT, SUBJECT IS FOUND TO BE FAR APART FROM FLASH REACHABLE RANGE) | DISPLAY MESSAGE INDICATING "LOCATE THE SUBJECT WITHIN FLASH REACHABLE RANGE (5M)." | 18 |
| EXCESSIVE EXPOSURE | | LIGHT INTENSITY IS EXCESSIVE FOR PHOTOGRAPHY (EXCESSIVE EXPOSURE IN CONDITION OF MINIMUM APERTURE RATIO AND MAXIMUM SHUTTER SPEED. E.G., THE SUN IS DIRECTLY PHOTOGRAPHED) | DISPLAY MESSAGE INDICATING "THE SUBJECT IS TOO BRIGHT. PLEASE SELECT ANOTHER SUBJECT." | 19 |

FIG. 3A

| ERROR CATEGORY | ERROR NO. | BATTERY LIFE | AVAILABLE MEMORY SPACE | MEMORY INITIALIZATION | MEMORY CARD PRESENCE | MEMORY CARD LOCKING STATE | APERTURE | SHUTTER SPEED | FOCUS | FOCAL LENGTH |
|---|---|---|---|---|---|---|---|---|---|---|
| UNABLE TO PHOTOGRAPH | 1 | 10% OR LESS | | | | | | | | |
| | 2 | | 2% OR LESS | | | | | | | |
| | 3 | | | NO | | | | | | |
| | 4 | | | | NO | | | | | |
| | 5 | | | | | LOCK | | | | |
| VIBRATION = INSUFFICIENT EXPOSURE | 6 | | | | | | MAXIMUM OPENING | 1/30 SEC OR LESS | | |
| | 7 | | | | | | MAXIMUM OPENING | 1/30 SEC OR LESS | | |
| | 8 | | | | | | MAXIMUM OPENING | 1/30 SEC OR LESS | | |
| UNABLE TO FOCUS | 9 | | | | | | | | UNABLE TO FOCUS | 30CM OR LESS |
| | 10 | | | | | | | | UNABLE TO FOCUS | |
| | 11 | | | | | | | | UNABLE TO FOCUS | INFINITE |
| | 12 | | | | | | | | | |
| ABNORMAL EXPOSURE | 13 | | | | | | | | | |
| | 14 | | | | | | | 1/60 SEC OR MORE | | |
| | 15 | | | | | | | | | |
| | 16 | | | | | | | 1/60 SEC OR MORE | | |
| | 17 | | | | | | | | | |
| | 18 | | | | | | | | | 5M OR MORE |
| EXCESSIVE EXPOSURE | 19 | | | | | | MINIMUM OPENING | 1/2000 SEC OR MORE | | |

FIG. 3B

| ERROR CATEGORY | ERROR NO. | VIBRATION-REDUCTION | ISO | FLASH | CLOSE-SHOT | PHOTO METRIC MODE | PHTOMETRY AT AF POINT | PHTOMETRY OF OUTPUT IMAGE | EV | AF ASSIST LIGHT | ... | SOLUTION NO. |
|---|---|---|---|---|---|---|---|---|---|---|---|---|
| UNABLE TO PHOTOGRAPH | 1 | | | | | | | | | | | 1 |
| | 2 | | | | | | | | | | | 2 |
| | 3 | | | | | | | | | | | 3 |
| | 4 | | | | | | | | | | | 4 |
| | 5 | | | | | | | | | | | 5 |
| VIBRATION = INSUFFICIENT EXPOSURE | 6 | OFF | 100-200 | OFF | | | | | | | | 6 |
| | 7 | ON | 100 | OFF | | | | | | | | 7 |
| | 8 | ON | 400-800 | OFF | | | | | | | | 8 |
| UNABLE TO FOCUS | 9 | | | | OFF | | | | | | | 9 |
| | 10 | | | | | | | | | OFF | | 10 |
| | 11 | | | | | | | | | | | 11 |
| | 12 | | | | | | INSUFFICIENT | | | ON | | 12 |
| ABNORMAL EXPOSURE | 13 | | | | | EXCEPT SPOT MODE | EXCESSIVE | | | | | 13 |
| | 14 | | | | | EXCEPT SPOT MODE | INSUFFICIENT | | | | | 14 |
| | 15 | | | | | | | | | | | 15 |
| | 16 | | | | | | | EXCESSIVE | 1.0 OR MORE | | | 16 |
| | 17 | | | | | | | INSUFFICIENT | -1.0 OR LESS | | | 17 |
| | 18 | | | ON | | | EXCESSIVE | | | | | 18 |
| EXCESSIVE EXPOSURE | 19 | | | | | | INSUFFICIENT | | | | | 19 |

FIG. 4A

| | SOLUTION NO. | BEFORE USER SELECTS SOLUTION DISPLAYED ON D-BUTTON | |
|---|---|---|---|
| | | TEXT DISPLAYED ON D-BUTTON | OSD OUTPUT |
| UNABLE TO PHOTOGRAPH | 1 | POWER-SAVING MODE | BLINKING BATTERY ICON |
| | 2 | SECURE MEMORY SPACE | BLINKING MEMORY CARD ALERT |
| | 3 | INITIALIZE MEMORY | BLINKING MEMORY CARD ALERT |
| | 4 | INSERT MEMORY | BLINKING MEMORY CARD ALERT |
| | 5 | LOCK MEMORY | BLINKING MEMORY CARD ALERT |
| VIBRATION = INSUFFICIENT EXPOSURE | 6 | VIBRATION-REDUCTION ON | BLINKING VIBRATION-REDUCTION ICON |
| | 7 | INCREASE ISO | BLINKING CURRENT ISO LEVEL |
| | 8 | FLASH ON | BLINKING FLASH ICON |
| UNABLE TO FOCUS | 9 | CLOSE-SHOT ON | BLINKING AP POINT |
| | 10 | CHECK AS ASSIST LIGHT | BLINKING AP POINT |
| | 11 | CHECK SUBJECT | BLINKING AP POINT |
| | 12 | CHECK AF ASSIST LIGHT | BLINKING AP POINT |
| ABNORMAL EXPOSURE | 13 | SPOT MODE | BLINKING CURRENT PHOTOMETRIC MODE ICON |
| | 14 | SPOT MODE | BLINKING CURRENT PHOTOMETRIC MODE ICON |
| | 15 | SET FILL-IN FLASH ON | BLINKING FLASH ICON |
| | 16 | ADJUST EV | BLINKING EV |
| | 17 | ADJUST EV | BLINKING EV |
| | 18 | CHECK SUBJECT | |
| EXCESSIVE EXPOSURE | 19 | CHECK SUBJECT | BLINKING APERTURE RATIO AND SHUTTER SPEED |

FIG. 4B

| SOLUTION CATEGORY | SOLUTION NO. | AFTER USER SELECTS SOLUTION DISPLAYED ON D-BUTTON ||||
|---|---|---|---|---|---|
| | | MESSAGE OUTPUT | OSD OUTPUT | CHANGE SETTINGS | CHANGE MODE |
| UNABLE TO PHOTOGRAPH | 1 | MODE HAS CHANGED TO MAXIMUM POWER-SAVING MODE | CHANGE BATTERY ICON COLOR TO RED | MINIMUM SCREEN BRIGHTNESS, FLASH OFF, AND AF ASSIST LIGHT OFF | MAXIMUM POWER SAVING MODE |
| | 2 | PLEASE DELETE BACKUP PHOTOS OR OBSCURE PHOTOS TO CONTINUE PHOTOGRAPHY | | | MULTI-DELETE MODE AFTER DISPLAYING MESSAGE |
| | 3 | THE MEMORY IS NOT INITIALIZED. PLEASE INITIALIZE THE MEMORY | | | FORMAT MODE AFTER DISPLAYING MESSAGE |
| | 4 | NO MEMORY. PLEASE INSERT THE MEMORY | | | STANDBY MODE AFTER DISPLAYING MESSAGE |
| | 5 | THE MEMORY IS LOCKED. PLEASE UNLOCK THE MEMORY | | | STANDBY MODE AFTER DISPLAYING MESSAGE |
| VIBRATION = INSUFFICIENT EXPOSURE | 6 | | STOP BLINKING VIBRATION-REDUCTION ICON | VIBRATION-REDUCTION ON | |
| | 7 | | ADJUSTED ISO LEVEL | INCREASE ISO | |
| | 8 | | STOP BLINKING FLASH ICON | FLASH ON | |
| UNABLE TO FOCUS | 9 | | STOP BLINKING AF POINT | CLOSE-SHOT ON | |
| | 10 | | STOP BLINKING AF POINT | | |
| | 11 | PLEASE LOCATE THE SUBJECT WITHIN A FOCAL AREA | STOP BLINKING AF POINT | | |
| | 12 | PLEASE CHECK WHETHER AF ASSIST LIGHT IS BLOCKED BY THE FINGER, OR CHECK WHETHER THE SUBJECT IS OUT OF AF ASSIST LIGHT | STOP BLINKING AF POINT | | |
| ABNORMAL EXPOSURE | 13 | | SPOT MODE ICON | SPOT MODE | |
| | 14 | | SPOT MODE ICON | SPOT MODE | |
| | 15 | | FLASH ON ICON | FLASH ON | |
| | 16 | | ADJUSTED EV | DECREES EV | |
| | 17 | | ADJUSTED EV | INCREASE EV | |
| | 18 | PLEASE LOCATE THE SUBJECT WITHIN A FLASH REACHABLE RANGE (5M) | | | |
| EXCESSIVE EXPOSURE | 19 | THE SUBJECT IS TOO BRIGHT. PLEASE SELECT ANOTHER SUBJECT | STOP BLINKING APERTURE RATIO AND SHUTTER SPEED WHEN IN OPTIMAL EXPOSURE STATE | | |

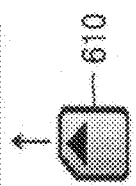

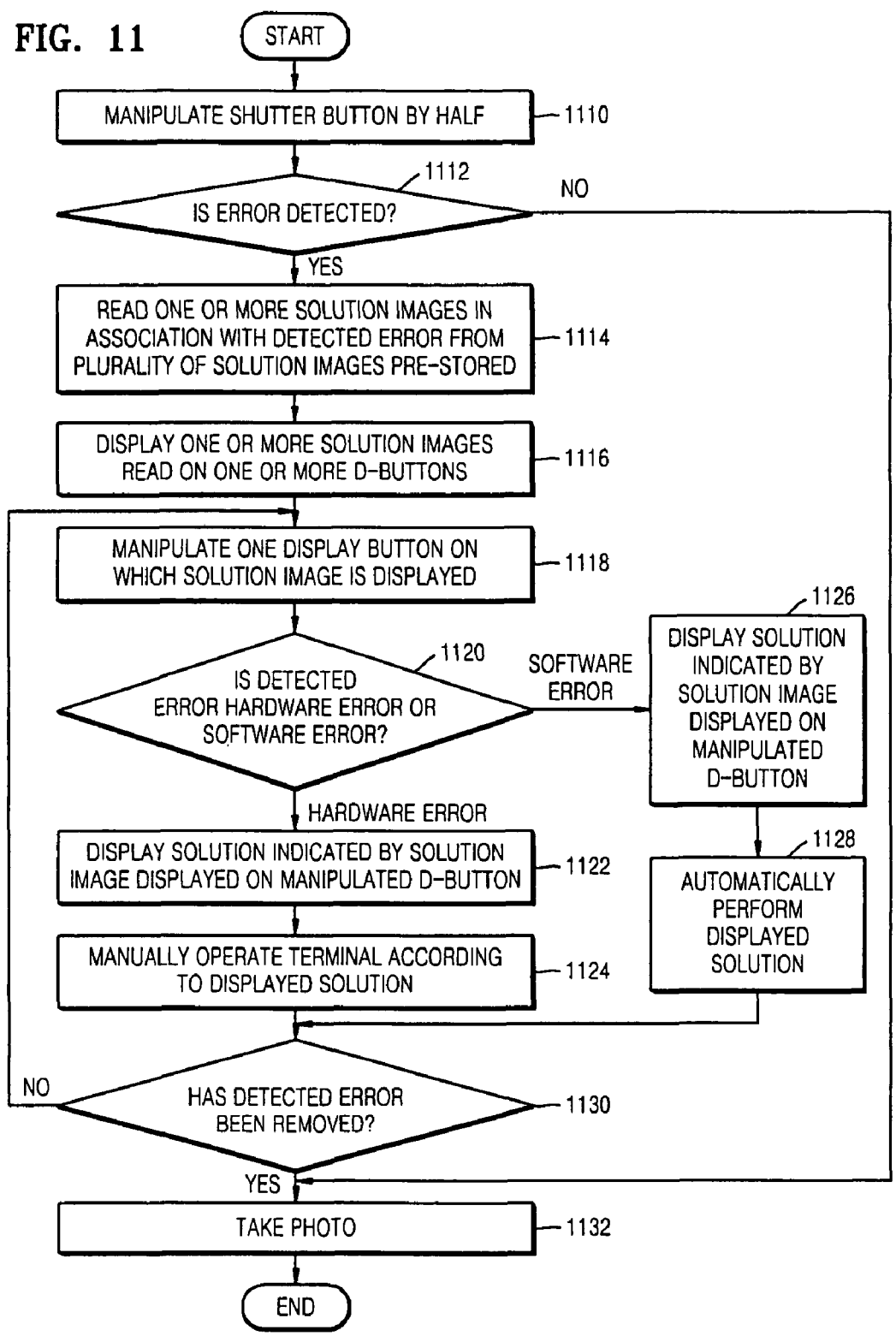

DEVICE HAVING CAMERA FUNCTION INCLUDING ERROR DETECTION AND DISPLAY METHOD AND MEDIUM THEREFOR

CROSS-REFERENCE TO RELATED APPLICATIONS

This application claims the priority benefit of Korean Patent Application No. 10-2006-0096404, filed on Sep. 29, 2006, in the Korean Intellectual Property Office, the disclosure of which is incorporated herein in its entirety by reference.

BACKGROUND

1. Field

Embodiments relate to a terminal (device) such as a digital camera, and more particularly, to a terminal (device) having a camera function and including a button for displaying an image thereon and a display method and medium for the terminal (device).

2. Description of the Related Art

Digital cameras can be used according to their hardware and software characteristics. For example, no picture can be taken when power is not supplied to the digital camera. In another example, when a picture is taken, a camera lens may be excessively or insufficiently exposed to light according to a determined shutter speed and an ON/OFF state of a flash so that the picture may generally look too bright or too dark.

In such cases, a camera user is notified about the problems. After, for example, checking whether power is supplied to the camera, determining the shutter speed, or checking the ON/OF state of the flash, the user manipulates a shutter button of the digital camera to take a picture having good quality.

However, such operations for obtaining high quality pictures may be difficult for those who are not familiar with the detailed functions and characteristics of the camera. Therefore, there is a high demand for a user-friendly camera.

SUMMARY

It is an aspect of embodiments discussed herein to provide a terminal having a camera function that allows a user who is not familiar with operations or detailed characteristics of a camera to easily solve a camera error.

It is also an aspect of embodiments discussed herein to provide a display method for a terminal having a camera function that allows a user who is not familiar with operations or detailed characteristics of a camera to easily solve a camera error.

According to an aspect of embodiments, there is provided a device having a camera function, including: a controller to detect error which causes abnormal operation of the camera function and to provide one or more solution images corresponding to the detected error; and a plurality of buttons to display the one or more solution images.

According to another aspect of embodiments, there is provided a device having a camera function, including: a controller to detect error which causes abnormal operation of the camera function and to provide one or more solution images corresponding to the detected error; and a display to display the provided solution images.

According to another aspect of embodiments, there is provided a display method performed in a device having a camera function, including) detecting error which is caused by abnormal operation of the camera function; and displaying one or more solution images corresponding to the detected error.

According to another aspect of embodiments, there is provided a device for capturing a photographic image, including a controller to detect error caused by abnormal photographic operation and to provide one or more solution images corresponding to the detected error; and at least one button to display the one or more solution images.

According to another aspect of embodiments, there is provided a display method performed in a device having a camera function and a plurality of buttons, including: detecting error which is caused by abnormal operation of the camera function; and displaying one or more solution images corresponding to the detected error on the plurality of buttons.

According to another aspect of embodiments, there is provided a display method performed in a device for capturing a photographic image, wherein the device has at least one display button, the display method including (a) detecting error which is caused by abnormal operation of the photographic operation; and (b) displaying one or more solution images corresponding to the detected error on the at least one display button.

According to another aspect of embodiments, there is provided at least one computer readable medium storing computer readable instructions to implement methods of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages will become apparent and more readily appreciated from the following description of exemplary embodiments, taken in conjunction with the accompanying drawings of which:

FIGS. 2A and 2B are a table showing possible errors and solutions for solving the errors;

FIGS. 3A and 3B are a table showing examples of error information and cause information respectively stored in a cause information storage and a solution information storage;

FIGS. 4A and 4B are a table showing an example of solution information stored in a solution information storage shown in FIG. 1;

FIG. 11 is a flowchart of a display method according to an exemplary embodiment.

DETAILED DESCRIPTION OF EMBODIMENTS

Figure 1:
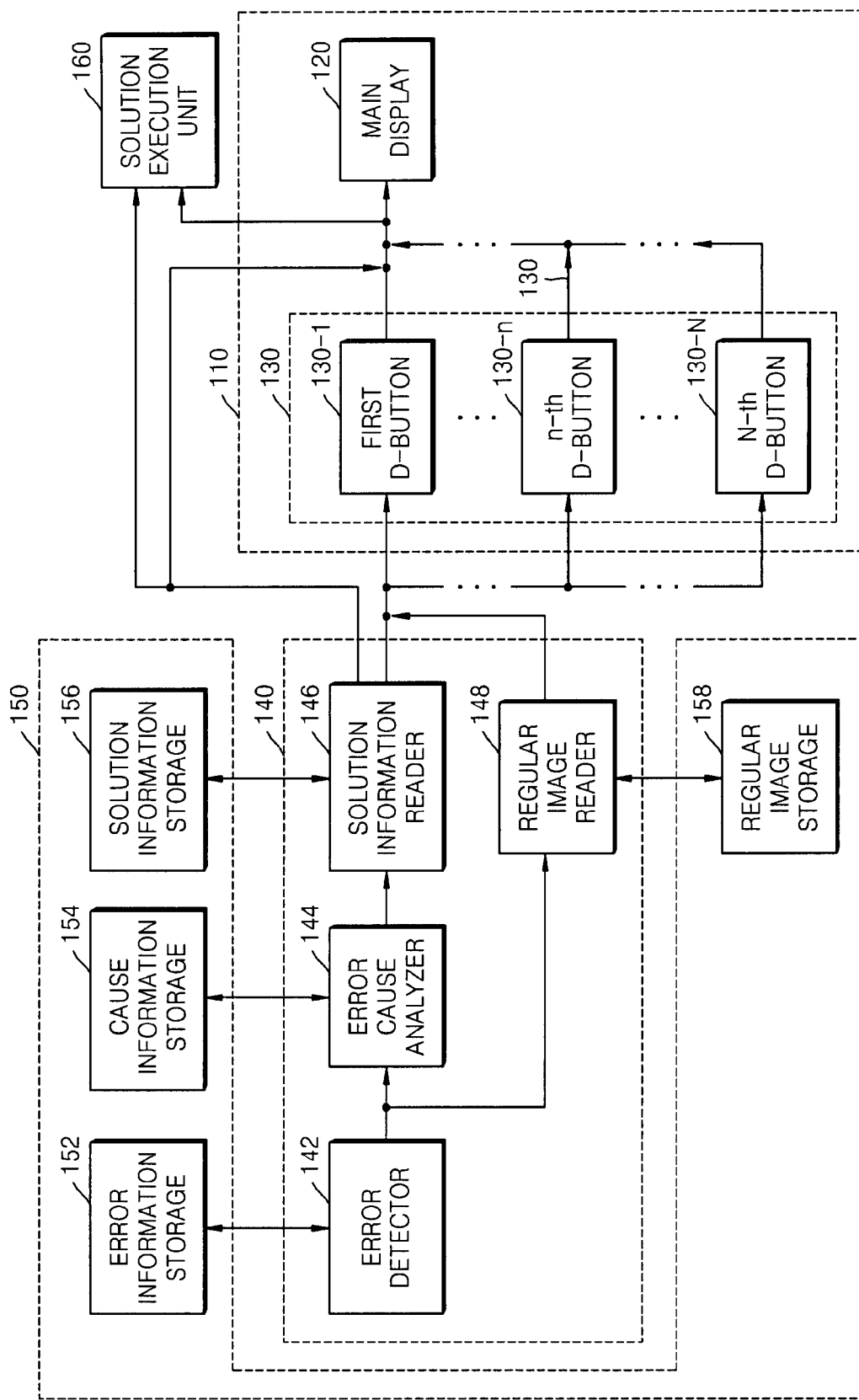
FIG. 1 is a block diagram of a terminal (device) having a camera function according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a block diagram of a terminal (device) having a camera function according to an exemplary embodiment.

FIGS. 2A and 2B are a table showing possible errors and measures for solving the errors.

Referring to FIG. 1, the terminal (device) having a camera function may include a display unit 110, a controller 140, a storage unit 150, and a solution execution unit 160. The storage unit 150 may be included in the terminal (device) or may be included in an external device connected to the terminal (device) through a network.

The display unit 110 may include one or more display panels (e.g., liquid crystal display (LCD) panel). An image is displayed on the display panel. For convenience of description, it is assumed that the display unit 110 includes only one display panel.

The display unit 110 may include a main display 120 and a sub-display 130. For example, the display panel may be divided into a first area and a second area, wherein the main display 120 displays an image on the first area while the sub-display 130 displays an image on the second area. Preferably, the first area is wider than the second area.

The main display 120 displays a photographic image taken using the terminal. Specifically, the photographic image is an image viewed through a lens included in the terminal.

The main display 120 may display a thumbnail image to indicate a software condition or a hardware condition of the terminal.

The software condition of the terminal is a condition that can be electrically modified. For example, the software condition may be the available space of a memory placed in the terminal, an ON/OFF state of a flash, or a sensitivity (ISO) level. In such cases, the available memory space is modified when the user deletes photographic images stored in the memory, the user can operate the terminal to turn on or of the flash, or the user can operate the terminal to regulate the ISO level, all these actions implying an electrical operation performed by the terminal The hardware condition is a condition that cannot be electrically modified. For example, whether a battery is placed in the terminal or whether a memory is placed in the terminal may be regarded as the hardware condition since the battery (or memory) can be separated from or placed in the terminal by mechanically operating the terminal.

Preferably, the terminal includes a plurality of buttons. The buttons may have a display function (hereinafter, such a button will be referred to as a D-button) or may not have a display function (hereinafter, such a button will be referred to as a no-display button).

The sub-display 130 may be implemented with a plurality of D-buttons 130-1, . . . , 130-n, . . . , 130-N, where n and N are integer numbers satisfying $1 \leq n \leq N$, and N is equal to or greater than 2.

The controller 140 generates a control signal. The storage unit 150 stores image data, which indicates all photographic images that can be displayed on the display unit 110, and a variety of error data.

Among the image data stored in the storage unit 150, the controller 140 reads image data corresponding to a "result obtained by manipulating a button" and then generates the control signal. The control signal denotes a signal corresponding to one or more photographic images indicated by the image data which is corresponding to the "result obtained by manipulating a button" and is selected from the image data stored in the storage unit 150.

In this case, the button may be either one of the D-buttons 130-1, . . . , 130-n, . . . , 130-N or a no-display button. "The result obtained by manipulating a button" may be related to an answer for the questions such as "Which and how a button is manipulated among the plurality of D-buttons 130-1, . . . , 130-n, . . . , 130-N and a plurality of no-display buttons?" or "Which button has been manipulated immediately before a current button is manipulated?". For example, "the result obtained by manipulating a button" may include the following cases: the second D-button 130-2 is pressed immediately before the third D-button 130-3 is pressed; the first D-button 130-1 is pressed immediately before the seventh D-button 130-7 is continuously pressed for one second or more; and the fourth D-button 130-4 is pressed immediately before a certain button is half-pressed.

The controller 140 provides the read image data and the generated control signal to the display unit 110. In this case, the main display 120 displays the photographic image and the thumbnail image irrespective of the control signal. The sub-display 130 displays one or more photographic images indicated by the read image data in response to the control signal. The image displayed on the sub-display unit 110 is updated according to "the result obtained by manipulating a button" whenever the D-buttons or the no-display buttons are manipulated.

The controller 140 may include an error detector 142, an error cause analyzer 144, a solution information reader 146, and a regular image reader 148. The storage unit 150 may include an error information storage 152, a cause information storage 154, a solution information storage 156, and a regular image storage 158. The operations of the display unit 110, the controller 140, and the storage unit 150 will now be described in greater detail.

The error information storage 152 stores content of all possible errors that may occur corresponding to a condition of the terminal. The condition of the terminal may be either a hardware condition or a software condition. The content stored in the error information storage 152 may be the aforementioned error-related data.

An error denotes a condition that leads to abnormal operation of the camera function such as impossibility to take a picture or low picture quality which is unsatisfactory to a user. For convenience of description, it will be assumed that the error is selected from the following group: "unable to photograph", "the lens attached to the terminal is exposed to light to an extent less than a first reference value (a predetermined value) during a photographic operation (hereinafter, referred to as "insufficient exposure"), "unable to focus", "the lens attached to the terminal is exposed to light to an extent greater than a second reference value (a predetermined value) a photographic operation (hereinafter, referred to as "excessive exposure")" and "low photo quality is expected due to exposure state (hereinafter, referred as "abnormal exposure")" (see FIGS. 2A and 2B). It is desirable that all possible errors are pre-defined before the user takes a photo using the terminal. For example, as described above, the possible errors may be pre-defined as one of those selected from "unable to photograph", "insufficient exposure", "unable to focus", "excessive exposure", and "abnormal exposure". However, embodiments are not limited to the above group. Other possible errors may be pre-defined and added to the above group.

The error detector 142 reads the content stored in the error information storage 152 and determines whether the error indicated by the read content belongs to the condition of the terminal. For example, the error detector 142 determines whether "unable to photograph" belongs to the condition of the terminal, followed by "insufficient exposure", "unable to focus", "excessive exposure", and "abnormal exposure".

In this case, the process of determining whether one of the aforementioned errors belongs to the condition of the terminal is equivalent to the process for detecting an error by the error detector 142.

If the existence of any one of the errors is determined (that is, any one of the errors is detected), the error cause analyzer 144 analyzes the cause of the detected error. To this end, it is desirable that one or more causes of error occurrence are pre-defined in consideration of "errors that may belong to the condition of the terminal (hereinafter, referred as possible errors)".

The cause information storage 154 stores one or more pieces of cause information to addresses corresponding to the possible errors. The cause information denotes information regarding a cause of error occurrence. For example, the cause information may be the aforementioned error-related data.

Details of the causes of error occurrence will now be described with reference to FIGS. 2A and 2B.

The error "unable to photograph" may occur in the following cases: when the battery placed in the terminal runs out; when the memory placed in the terminal has insufficient available space; when the memory place in the terminal is not initialized and is thus unavailable; when the memory is not placed in the terminal; or when a memory is locked so that a photo cannot be stored in the memory placed in the terminal. The causes of the error "unable to photograph" are not limited to the above five cases. However, for convenience of description, it will be assumed that the causes thereof may be at least one of the above five cases.

The error "insufficient exposure" may occur in the following cases: when a vibration-reduction function is set to OFF; when ISO is set to be low; or when a flash is set to OFF. The causes of the error "insufficient exposure" are not limited to the above three cases. However, for convenience of description, it will be assumed that the causes thereof may be at least one of the above three cases.

The error "unable to focus" may occur in the following cases: when a focal length is set too short; when a subject to be photographed is too dark; when no focusing subject exists; or when an auto focus (AF) assist light cannot be detected by the terminal even if the AF assist light is turned on. The subject to be photographed is an object to be photographed is different from an image background. The AF assist light assists the terminal to adjust a focus when the intensity of an external light is insufficient, for example, at night. The causes of the error "unable to focus" are not limited to the above four cases. However, for convenience of description, it will be assumed that the causes thereof may be at least one of the above four cases.

The error "abnormal exposure" may occur in the following cases: when the subject is brighter than the image background (herein, a photometric mode is not a spot mode); when the subject is darker than the image background (herein, a photometric mode is not a spot mode); when the subject is darker than the image background (herein, a flash is set to OFF); when an exposure value (EV) is excessively set to a positive value (+); when an EV is excessively set to a negative value (−); or when the subject does not exist within a flash reachable range. In the spot mode, photometry is performed to measure light exposed to only a certain portion of an object to be photographed, where the portion is determined by the user, instead of measuring light exposed to the entire portion of the object to be photographed (that is, a photographic image displayed on the main display 210). The EV is used to compensate for a predetermined value of the intensity of incident light required during a photographic operation. For example, the higher the positive value of EV, the brighter photo is photographed by the terminal. The higher the negative value of EV, the darker photo is photographed is photographed by the terminal. The causes of the error "abnormal exposure" are not limited to the above six cases. However, for convenience of description, it will be assumed that the causes thereof may be at least one of the above six cases.

The error "excessive exposure" may occur when the subject to be photographed radiated too much light (e.g., the subject is the Sun). The cause of the error "excessive exposure" is not limited to this case. However, for convenience of description, it will be assumed that the cause thereof is the above case.

The error cause analyzer 144 reads one or more pieces of cause information from addresses corresponding to the errors detected by the error detector 142 and searches for cause information belonging to the condition of the terminal from the pieces of cause information read.

For example, if the error "unable to photograph" is detected, the error cause analyzer 144 reads five pieces of cause information as possible causes of error occurrence, which includes the following cases: when the battery placed in the terminal runs out; when the memory placed in the terminal has insufficient available space; when the memory place in the terminal is not initialized and is thus unavailable; when the memory is not placed in the terminal; or when the memory is locked so that a photo cannot be stored in the memory placed in the terminal.

Then, for each of the read pieces of cause information, the error cause analyzer 144 examines whether the causes of error occurrence indicated by the read cause information belong to the condition of the terminal.

If a plurality of pieces of cause information is read, an examination order of the pieces of cause information may be pre-defined. For example, among a plurality of causes of error occurrence indicated by the plurality of pieces of cause information, an experimental value may be used to determine the possibility of error occurrence so that a cause of error occurrence having a higher possibility can be examined prior to a cause of error occurrence having a lower possibility. Such an examination order is indicated by numbers (No.) in FIGS. 2A and 2B.

If the battery life is insufficient to take even one picture, the available space of the memory is insufficient to store even one picture, and the memory is locked and thus the photo cannot be stored in the memory, then the causes of error occurrence such as "The memory placed in the terminal is not initialized and is thus unavailable." and "The memory is not placed in the terminal." are not relevant to the current condition of the terminal. Thus, the error cause analyzer 144 determines that the cause of the detected error is resulted from one or more causes selected from the following cases: when the battery placed in the terminal runs out; when the memory placed in the terminal has insufficient memory space; and when the memory is locked so that a photo cannot be stored in the memory placed in the terminal.

To examine whether the cause of error occurrence indicated by the read cause information belongs to the condition of the terminal, the error cause analyzer 144 may analyze the hardware condition or the software condition of the terminal. As shown in FIGS. 2A and 2B, the software condition is analyzed to examine whether the cause of error occurrence belongs to the following cases: when the battery placed in the terminal runs out; when the memory placed in the terminal has insufficient memory space; or when the memory is locked so that a photo cannot be stored in the memory placed in the terminal. Similarly, the hardware condition is analyzed to examine whether the cause of error occurrence belongs to the following cases: when the memory is not placed in the terminal; or when the memory is locked so that the photo cannot be stored in the memory.

Once the error cause analyzer 144 finds out the cause of error occurrence, the solution information reader 146 provides a solution for the found cause of error occurrence. Preferably, solutions may be pre-defined for each of possible causes of error occurrence before the user takes a photo using the terminal.

To this end, the solution information storage 156 stores solution information to an address corresponding to the cause of error occurrence. The solution information may include data that indicates details of a solution and data that indicates an image for roughly displaying the solution (the image is hereinafter referred to as a solution image). For example, the solution information may be the image data stored in the storage unit 150.

The solution indicated by the solution information will now be described corresponding to the aforementioned causes of error occurrence with reference to FIGS. 2A and 2B.

For convenience of description, it will be assumed that the causes of the error "unable to photograph" (as described above occurring in the following cases: when the battery placed in the terminal runs out; when the memory placed in the terminal has insufficient memory space left; when the memory place in the terminal is not initialized and is thus unavailable; when the memory is not placed in the terminal; and when the memory is locked so that a photo cannot be stored in the memory placed in the terminal) are respectively addressed as follows: the terminal enters into a maximum power-saving mode; unnecessary photos stored in the memory are deleted according to a user instruction; the memory is initialized; the memory card is inserted in the terminal; and the memory card is unlocked.

It will be also assumed that the causes of the error "insufficient exposure" (as described above occurring in the following cases: when a vibration-reduction function is set to OFF; when ISO is set to low; and when a flash is set to OFF) are respectively addressed as follows: set the vibration-reduction function of the terminal to ON; increase ISO so that a shutter speed is over 60, and otherwise, maximize ISO; and set a flash to ON.

Likewise, it will be assumed that the causes of the error "unable to focus" (as described above occurring in the following cases: when a focal length is set to be too short; when the subject is too dark; when no subject exists to be focused; and when AF assist light cannot be detected by the terminal even if the AF assist light is turned on) are respectively addressed as follows: set a close-shot function to ON; turn on an AF assist light; locate the subject within a focal area; and check whether an AF assist light is blocked by a finger, and if so, remove the finger away from the AF assist light.

Likewise, it will be assumed that the causes of the error "abnormal exposure" (as described above occurring in the following cases: when the subject is brighter than a background (herein, a photometric mode is not a spot mode); when the subject is darker than a background (herein, a photometric mode is not a spot mode); when the subject is darker than a background (where a flash is set to OFF); when an exposure value (EV) is excessively set to +; when an EV is excessively set to −; and when the subject does not exist within a flash reachable range.) are respectively addressed as follows: set a photometric mode to a spot mode; set a photometric mode to a spot mode; set fill-in flash ON (that is, turn the flash ON all the time); increase an EV by a predetermined value; and locate the subject within a flash reachable range.

Likewise, it will be assumed that the causes of the error "excessive exposure" (as described above occurring in the cases when the intensity of light radiated by the subject is too strong (e.g., the subject is the Sun)) is addressed by the solution "Change the subject".

For each of one or more causes of error occurrence found by the error cause analyzer 144, the solution information reader 146 reads solution information having an address corresponding to the cause of error occurrence. Furthermore, the solution information reader 146 generates a control signal so that a solution image(s) indicated by the read solution information is displayed in response to the control signal. Then, the solution information reader 146 provides the generated control signal to the sub-display 130 along with the read solution information. Optionally, the solution information reader 146 may generate a control signal so that details of the solution indicated by the solution information selected from the pieces of solution information read is displayed in response to the control signal, and thereafter provides the generated control signal to the main display 120 along with the selected solution information.

The sub-display 130, that is, the first D-button 130-1 to the N-th D-button 130-N, displays one or more solution images indicated by the provided solution information in response to the control signal. The user may select one of the solution images from the displayed solution images. To this end, the user manipulates any one of the D-buttons 130-1, ..., 130-n, 130-N to on which a solution image to be selected is displayed. Preferably, the manipulated D-button may be displayed with a blinking solution image thereon. Accordingly, the user can easily recognize the selected solution image.

Preferably, upon manipulating one of the D-buttons 130-1, ..., 130-n, ..., 130-N (that is, a certain solution image is selected), the main display 120 may display details of the solution indicated by the selected solution image in response to the control signal.

For example, if the selected solution is "Initialize the memory", then the main display 120 displays a message indicating "The memory has been initialized." Likewise, if the selected solution is "set a vibration-reduction function of the terminal to ON", then the main display 120 displays a message indicating "The vibration-reduction function of the terminal is set to ON."

Similarly, if the selected solutions are "Insert the memory card into the terminal," "Unlock the memory card," "Locate the subject within a focal area," "Check whether an AF assist light is blocked by a finger, and if so, remove the finger away from the AF assist light," "Locate the subject within a flash reachable range.", and "Change the subject," then the main display 120 respectively displays the following messages: "No memory card," "Insert the memory card," "The memory card is locked. Please unlock the memory card," "Locate the subject within a focal area," "Check whether AF assist light is blocked by a finger," "Locate the subject within a flash reachable range (5 m)," and "The subject is too bright. Select another subject."

If the error detected by the error detector 142 does not belong to the condition of the terminal, the error detector 142 allows the regular image reader 148 to operate. The error cause analyzer 144 provides one or more regular images to the sub-display 130. The regular image is an image displayed on the sub-display 130 when no error is detected by the error detector 142. As described above, the main display 120 may display a thumbnail image indicating the software condition of the terminal. For example, the regular image may indicate the software condition in the form of the thumbnail image.

Specifically, the regular image storage 158 stores data indicating all possible regular images that can be displayed on the sub-display 130. For example, the stored data may be the image data stored in the storage unit 150.

The regular image reader 148 reads the data stored in the regular image storage 158 and provides the read data to the sub-display 130. Accordingly, the sub-display 130 displays one or more regular images indicated by the provided data.

The solution execution unit 160 performs a solution indicated by a solution image displayed on a D-button manipulated by the user among one or more D-buttons for displaying one or more solution images. Preferably, the solution execution unit 160 may operate only when the solution indicated by the solution image displayed on the manipulated D-button is one of solutions for changing the software condition of the terminal (any one selected from No.=1, 2, 3, 6, 7, 8, 9, 10, 13, 14, 15, 16, 17 in FIGS. 2A and 2B). This is because, if the solution indicated by the solution image displayed on the manipulated D-button is one of solutions for changing the hardware condition of the terminal (any one selected from No.=4, 5, 11, 12, 18, 19 in FIGS. 2A and 2B), such solution can neither be automatically performed nor be electrically recognized by the terminal. Thus, the solution can be performed manually by the user.

Unlike as shown in FIG. 1, the aforementioned error cause analyzer 144 and the cause information storage 154 may not be included in the terminal. In this case, the solution information storage 156 stores solution information using an address corresponding to an error. Then, the solution information reader 146 reads solution information having the address corresponding to the error detected by the error detector 142 from the stored solution information.

FIGS. 3A and 3B are a table showing examples of error information and cause information respectively stored in the cause information storage 154 and the solution information storage 156. In FIGS. 3A and 3B, an error No. and a solution No. are the same as No. of FIGS. 2A and 2B. The causes of error occurrence described in FIGS. 1 and 2 are described in greater detail in FIGS. 3A and 3B.

For example, No.=8 of FIGS. 1 and 2 is assigned to a cause of an error occurring when a flash is set to OFF. However, in No.=8 of FIGS. 3A and 3B, the cause of error occurrence is further described in detail such that an aperture is open to the maximum, a shutter speed is set to ⅟30 sec or less, a vibration-reduction function of the terminal is set to ON, ISO is set to a level in the range of 400 to 800, and a flash is set to OFF.

FIGS. 4A and 4B are a table showing an example of solution information stored in the solution information storage 156 shown in FIG. 1. In FIGS. 4A and 4B, a solution No. is the same as No. of FIGS. 2A and 2B. A solution and the operation of the terminal when the solution is selected, as described with reference to FIGS. 1 and 2, will now be described in greater detail with reference to FIGS. 4A and 4B.

The sub-display 130 displays a plurality of regular images until the solution information reader 146 provides a solution image to the sub-display 130. The sub-display 130 can display a total of 14 regular images. If N=14, the sub-display 130 can collectively display all of the 14 regular images. If 1≦N≦13, the sub-display 130 collectively displays N regular images among the 14 regular images. The number of N regular images collectively displayed may change by manipulating a scroll button (e.g., a direction key) provided in the terminal.

The 14 regular images respectively indicate "power-saving mode", "secure memory space", "initialize memory", "insert memory", "lock memory", "vibration-reduction ON", "increase ISO", "flash ON", "close-shot ON", "check AF assist light", "check subject", "set spot mode", "set fill-in flash ON", and "adjust EV".

The regular image indicating "power-saving mode" is provided to request the terminal to operate in the power-saving mode. The regular image indicating "secure memory space" is provided to request the terminal to expand a remaining available memory space. The regular image indicating "initialize memory" is provided to request the terminal to initialize the memory. The regular image indicating "insert memory" is provided to request the user to insert the memory card into the terminal. The regular image indicating "lock memory" is provided to request the user to lock the memory card. The regular image indicating "vibration-reduction ON" is provided to request the terminal to turn on the vibration-reduction function. The regular image indicating "check AF assist light" is provided to request the user to check whether the AF assist light is blocked by a finger. The regular image indicating "check subject" is provided to request the user to move the location of the subject. The regular image indicating "set spot mode" is provided to request the terminal to change a photometric mode to a spot mode. The regular image indicating "set fill-in flash ON" is provided to request the terminal to turn on the flash all the time. The regular image indicating "adjust EV" is provided to request the terminal to adjust the EV.

When the sub-display 130 displays the regular images, the user may select one of the displayed regular images by manipulating a corresponding D-button. In this case, the main display 120 may display a thumbnail image to show the selected regular image. The on-screen display (OSD) output described in FIGS. 4A and 4B is an image displayed on a display panel by the main display 120. The OSD output may be a thumbnail image. The OSD output will now be described in detail.

For example, upon selecting the regular image indicating "power-saving mode", the main display 120 may display a blinking battery icon. Upon selecting the regular image indicating "secure memory space", "initialize memory", "insert memory", or "lock memory", the main display 120 may display a blinking memory card icon. Upon selecting the regular image indicating "vibration-reduction ON", the main display 120 may display a blinking vibration-reduction icon.

Likewise, upon selecting the regular image indicating "increase ISO", the main display 120 may display a blinking current ISO level. Upon selecting the regular image indicating "flash ON" or "set fill-in flash ON", the main display 120 may display a blinking flash icon. Upon selecting the regular image indicating "close-shot ON", "check AF assist light" or "check subject (No.=11)", the main display 120 may display a blinking AF point. The AF point denotes a reference point for adjusting the focus.

Similarly, upon selecting the regular image indicating "set spot mode", the main display 120 may display a blinking photometric mode icon. Upon selecting the regular image indicating "adjust EV", the main display 120 may display a blinking current EV. Upon selecting the regular image indicating "check subject (No.=19)", the main display 120 may display a blinking current aperture ratio and a blinking shutter speed.

When the solution information reader 146 provides one or more solution images to the sub-display 130, the image being displayed on the sub-display 130 changes from the aforementioned regular images to solution images. That is, the sub-display 130 displays one or more solution images received from the solution information reader 146.

Thereafter, when the user manipulates a D-button on which the solution image (No.=1) is displayed, the terminal operates in the maximum power-saving mode. Specifically, the main-display 120 changes the battery icon to red while displaying a message indicating "Change to maximum power-saving mode." The solution execution unit 160 sets an overall brightness of the photographic image displayed on the main display 120 as low as possible and then sets the flash and the AF assist light to OFF.

When the user manipulates a D-button on which the solution image (No.=2) is displayed, the main display 120 displays a message indicating "Please delete backup photos or obscure photos to continue photography." Then, the terminal operates in a multi-delete mode. The multi-delete mode denotes a mode in which the terminal enables the stored photos to be displayed on the main display 120, asks the user whether to delete each photo, and, if the user requests to delete a photo, deletes the photo.

When the user manipulates a D-button on which the solution image (No.=3) is displayed, the main display 120 displays a message indicating "The memory has not been initialized. Please initialize the memory." Then, the terminal operates in a format mode. The format mode denotes a mode in which the terminal initializes the memory.

When the user manipulates a D-button on which the solution image (No.=4) is displayed, the main display 120 displays a message indicating "No memory. Please insert the memory." Then, the terminal operates in a stand-by mode. The strand-by mode denotes a mode in which the terminal performs no operation. Preferably, when the terminal operates in the stand-by mode, the main display 120 does not display any image including the photographic image. The user may insert the memory card into the terminal while the terminal operates in the stand-by mode.

When the user manipulates a D-button on which the solution image (No.=5) is displayed, the main display 120 displays a message indicating "The memory is locked. Please unlock the memory." Then, the terminal operates in a stand-by mode. The user may unlock the memory by manipulating a memory lock button included in the terminal while the terminal operates in the stand-by mode.

When the user manipulates a D-button on which the solution image (No.=6) is displayed, the solution execution unit 160 turns on the vibration-reduction function of the terminal, and the main display 120 stops displaying the blinking vibration-reduction icon.

When the user manipulates a D-button on which the solution image (No.=7) is displayed, the solution execution unit 160 increases the ISO level, and the main display 120 displays the increased ISO level.

When the user manipulates a D-button on which the solution image (No.=8) is displayed, the solution execution unit 160 turns on the flash, and the main display 120 stops displaying the blinking flash icon.

When the user manipulates a D-button on which the solution image (No.=9) is displayed, the solution execution unit 160 turns on the close-shot function of the terminal, and the main display 120 stops displaying the blinking AF point.

When the user manipulates a D-button on which the solution image (No.=10) is displayed, the main display 120 stops displaying the blinking AF point.

When the user manipulates a D-button on which the solution image (No.=11) is displayed, the main display 120 displays a message indicating "Please locate the subject within a focal area" and stops displaying the blinking AF point.

When the user manipulates a D-button on which the solution image (No.=12) is displayed, the main display 120 displays a message indicating "Please check whether AF assist light is blocked by the finger, or check whether the subject is out of AF assist light" and stops displaying the blinking AF point.

When the user manipulates a D-button on which the solution image (No.=13 or 14) is displayed, the solution execution unit 160 sets the photometric mode to the spot mode, and the main display 120 displays a spot mode icon.

When the user manipulates a D-button on which the solution image (No.=15) is displayed, the solution execution unit 160 turns on the flash, and the main display 120 displays a flash ON icon.

When the user manipulates a D-button on which the solution image (No.=16) is displayed, the solution execution unit 160 decreases the EV, and the main display 120 displays the decreased EV.

When the user manipulates a D-button on which the solution image (No.=17) is displayed, the solution execution unit 160 increases the EV, and the main display 120 displays the increased EV.

When the user manipulates a D-button on which the solution image (No.=18) is displayed, the main display 120 displays a message indicating "Please locate the subject within a flash reachable range (5 m)."

When the user manipulates a D-button on which the solution image (No.=19) is displayed, the main display 120 displays a message indicating "The subject is too bright. Please select another subject." Thereafter, when the user changes the subject, and thus the error detector 142 is no longer able to detect an error of "excessive exposure", then the main display 120 stops displaying the blinking aperture ratio and the blinking shutter speed.

FIGS. 5A through 5D illustrates views for briefly explaining a terminal (device) having a camera function and a display method therefor according to an exemplary embodiment.

Figure 5C:
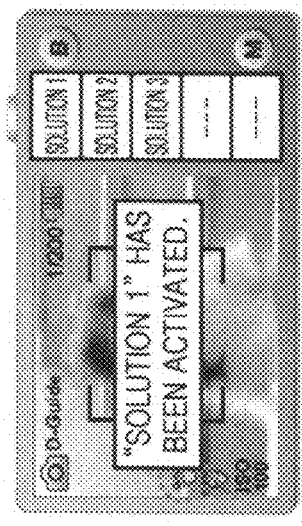
FIGS. 5A through 5D illustrate views for briefly explaining a terminal (device) having a camera function and a display method therefor according to an exemplary embodiment.
Figure 5B:
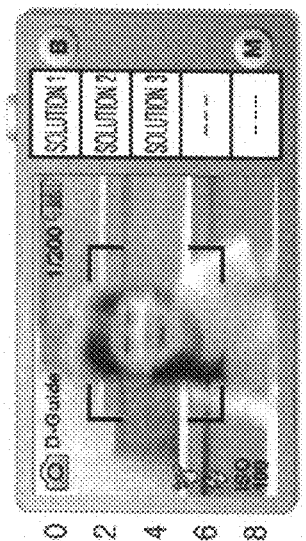
Figure 5A:
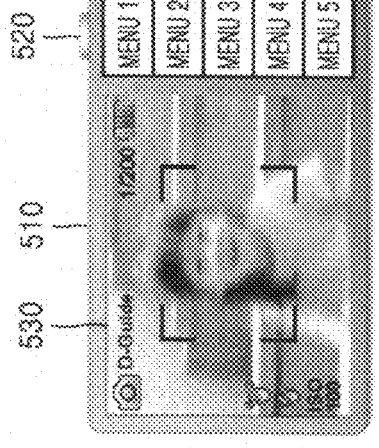

Referring to FIG. 5A, an LCD panel 530 included in a terminal 510 displays a photographic image, and five D-buttons 540 to 548 respectively display five regular images (menus 1 to 5). The LCD panel 530 corresponds to an area on which an image is displayed by the main display 120. The number of regular images displayed on the D-buttons 540 to 548 is not limited to five.

When a user wants to take a photographic image and see the photographic image displayed on the LCD panel 530 included in the terminal 510, the user manipulates (e.g., presses) a shutter button 520. If the shutter button 520 is fully pressed, the terminal 510 captures the photographic image being displayed while the shutter button 520 is pressed. On the other hand, if the shutter button 520 is half pressed so that the terminal 510 performs a half-shutter function, the error detector 142 operates.

As a result, when any error which belongs to the hardware condition or the software condition of the terminal 510 is detected, as shown in FIG. 5B, the D-buttons 540 to 544 display three solution images (solution 1 to solution 3). The number of solution images corresponding to the detected errors is not limited to three.

When the user selects the solution image (solution 1) from among the solution images, the solution image (solution 1) may blink. The solution image (solution 1) may continuously blink until a solution indicated by the solution image (solution 1) is completely performed.

The solution may be carried out as follows. If the selected solution image (solution 1) requests to change the hardware condition of the terminal 510, the solution may be performed manually by the user. On the other hand, if the selected solution image (solution 1) requests to change the software condition of the terminal 510, the solution may be automatically performed by the terminal 510.

If the selected solution image (solution 1) requests to change the software condition of the terminal 510 while performing the solution, as shown in FIG. 5C, the LCD panel 530 may display a message indicating "Solution 1 has been activated." The message indicating "Solution 1 has been activated" means that solution 1 is performed.

After the solution is performed, the error detector 142 determines whether the detected error has been removed.

Figure 5D:
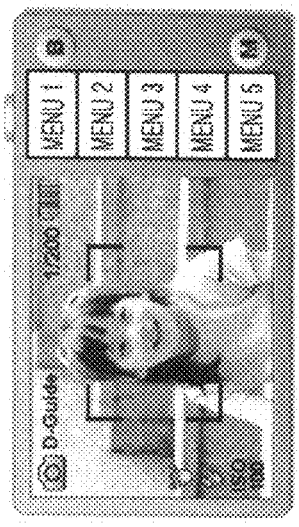

If the determination result shows that the detected error has been removed, as shown in FIG. 5D, the D-buttons 540 to 548 re-display the regular images (menu 1 to menu 5). Preferably, the user fully presses the shutter button 520 to take a photo only after all of the detected errors are removed.

Conversely, if the detected errors are not completely removed, the D-buttons 540 and 542 may not display the previously selected solution image (solution 1). Instead, the D-buttons 540 and 542 may display other solution images (solution 2 and solution 3) rather than the previously selected solution image (solution 1). In this case, the user selects one of the displayed solution images, and thereafter, when a solution indicated by the selected solution image is performed, the error detector 142 re-determines whether the detected error has been removed.

FIGS. 6A through 10D illustrate views for explaining a terminal having a camera function and a display method therefor in consideration of a condition of the terminal, according to an exemplary embodiment.

FIGS. 6A through 6E illustrate views when the error "unable to photograph" occurs.

Figure 6C:
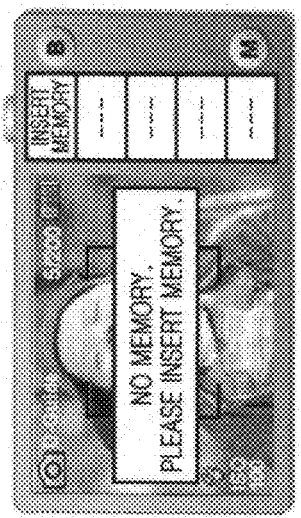
FIGS. 6A through 10D illustrate views for explaining a terminal (device) having a camera function and a display method therefor in consideration of a condition of the terminal, according to an exemplary embodiment.
Figure 6B:
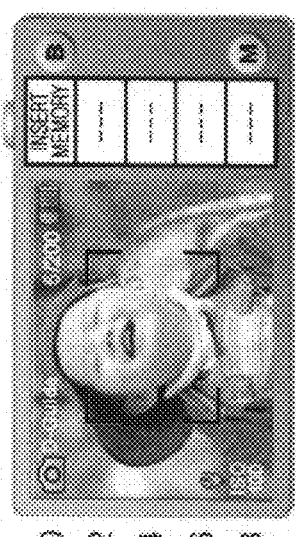
Figure 6E:
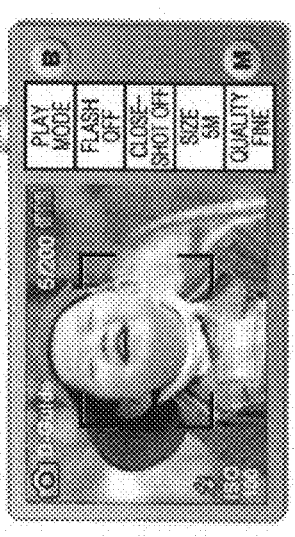
Figure 6A:
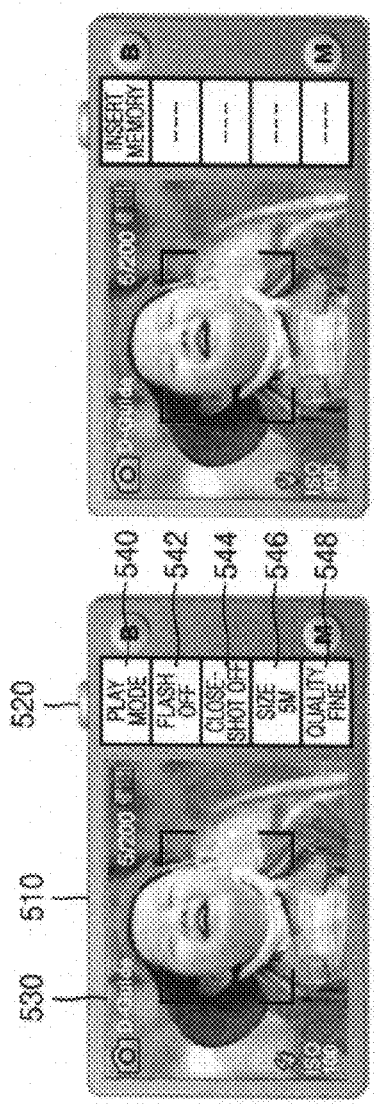

Referring to FIG. 6A, the LCD panel 530 displays a photographic image, and the plurality of D-buttons 540 to 548 display regular images 540 to 548 (i.e., "play mode", "flash OFF", "macro OFF", "size 5 m", "quality fine"). The regular image indicating "play mode" requests to set a play mode. The regular image indicating "flash OFF" requests to set a flash On/Off. The regular image indicating "macro OFF" requests to set a close-shot function On/Off. The regular image indicating "size 5 m" requests to set a size of a photo to be taken. The regular image indicating "quality fine" requests to set the resolution of the photo to be taken.

In this case, when the user half presses the shutter button 520, the error detector 142 detects an error belonging to the hardware condition or the software condition. If the error detector 142 detects the error "unable to photograph", as shown in FIG. 6B, the D-button 540 may display a solution image indicating "insert memory".

Thereafter, when the user manipulates the D-button 540, as shown in FIG. 6C, the LCD panel 530 displays a message indicating "No memory. Please insert the memory." while the manipulated D-button 540 displays the blinking solution image indicating "insert memory".

Figure 6D:
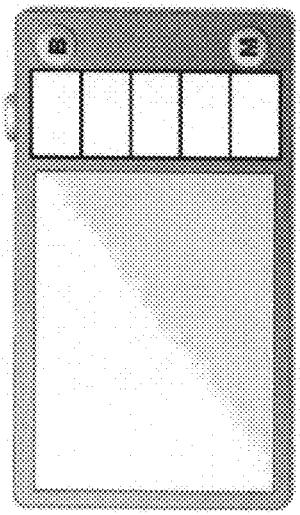

Thereafter, the terminal 510 operates in a standby mode. While the terminal 510 operates in the standby mode, as shown in FIG. 6D, the LCD panel 530 and the D-buttons 540 to 548 may display no image. At this time, the user may insert a memory card 610 into the terminal 510.

Once the memory card 610 is placed in the terminal 510, the LCD panel 530 displays the photographic image, and the error detector 142 determines whether the detected error has been removed. If the detected error has been removed, as shown in FIG. 6E, the D-buttons 540 to 548 re-display the regular images. Preferably, the user fully presses the shutter button 520 in this state to take a photo.

FIGS. 7A through 7D illustrate views when an error "insufficient exposure" occurs.

Figures 7A, 7B, 7C, 7D:
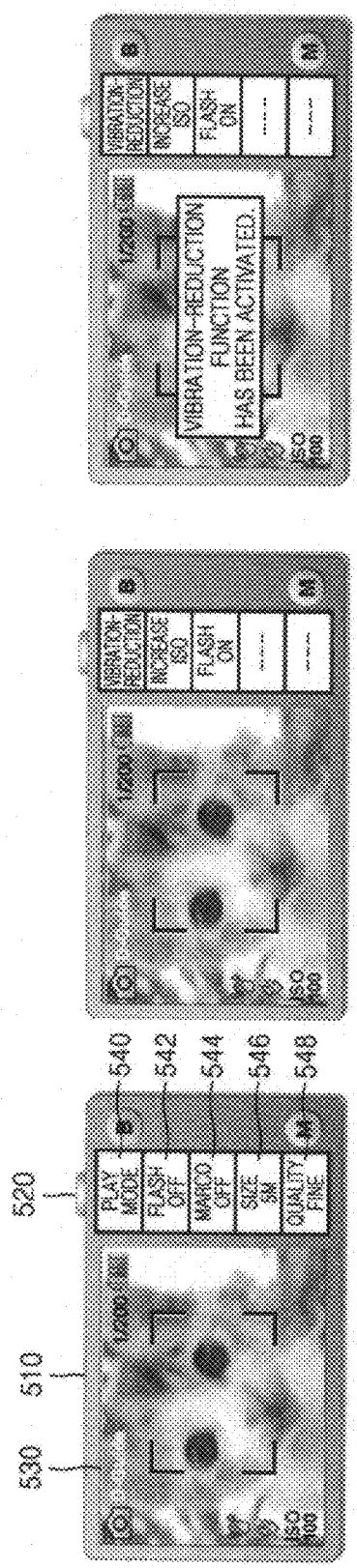

Referring to FIG. 7A, the LCD panel 530 displays a photographic image, and the plurality of D-buttons 540 to 548 display regular images (i.e., "play mode", "flash OFF", "macro OFF", "size 5 m", "quality fine").

In this case, when the user half presses the shutter button 520, the error detector 142 detects an error belonging to the hardware condition or the software condition. If the error detector 142 detects the error "insufficient exposure", as shown in FIG. 7B, the D-buttons 540 to 544 may display solution images indicating "vibration-reduction ON", "increase ISO", and "flash ON."

The D-buttons may display a plurality of solution images in such a manner that a solution image corresponding to a cause (e.g., the vibration-reduction function of the terminal 510 is set to OFF) of the detected error, wherein the cause has the highest probability among all possible causes according to experimental results, is displayed at a position (e.g., the D-button 540) which is expected to be first noticed by the user, while a solution image corresponding to a cause (e.g., the flash is set to OFF) of the detected error, wherein the cause has the lowest probability, is displayed at a position (e.g., the D-button 548) which is expected to be lastly noticed by the user. Therefore, a time for removing the detected error can be significantly reduced.

Likewise, the D-buttons may display a plurality of solution images in such as manner that a solution image indicating a solution (e.g., the vibration-reduction function of the terminal 510 is set to ON), wherein the solution can remove the detected error the most effectively according to experimental results, is displayed at a position (e.g., the D-button 540) which is expected to be first noticed by the user, while a solution image indicating a solution (e.g., turn the flash on), wherein the solution can remove the detected error the least effectively, is displayed at a position (e.g., the D-button 548) which is expected to be last noticed by the user. Therefore, a time for removing the detected error can be significantly reduced.

When the user selects a solution image indicating "vibration-reduction ON" by manipulating the D-button 540, the manipulated D-button 540 displays the blinking solution image indicating "vibration-reduction ON."

In this case, the terminal 510 automatically turns on the vibration-reduction function, and the LCD panel 530 displays a message indicating "The vibration-reduction function has been activated." as shown in FIG. 7C. As a result, a solution indicated by the selected solution image ("vibration-reduction ON") is performed, and then the solution image ("vibration-reduction ON") stops blinking.

After the solution indicated by the selected solution image ("vibration-reduction ON") is completely performed, the error detector 142 determines whether the detected error has been removed. If the detected error has been removed, the D-buttons 540 to 548 re-display the regular images as shown in FIG. 7D. Preferably, the user fully presses the shutter button 520 in this state to take a photo.

FIGS. 8A through 8F illustrate views when an error "insufficient exposure" occurs.

Figure 8A:
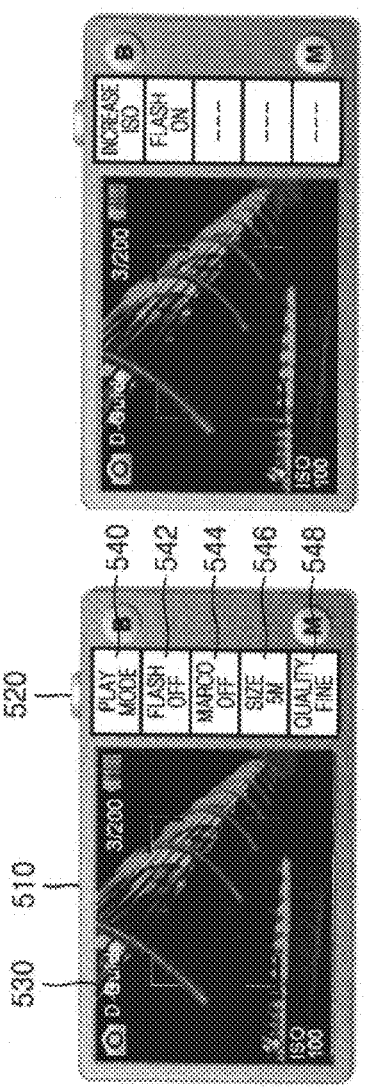

Referring to FIG. 8A, the LCD panel 530 displays a photographic image, and the D-buttons 540 to 548 display regular images (i.e., "play mode", "flash OFF", "macro OFF", "size 5 m", and "quality fine").

Figure 8B:
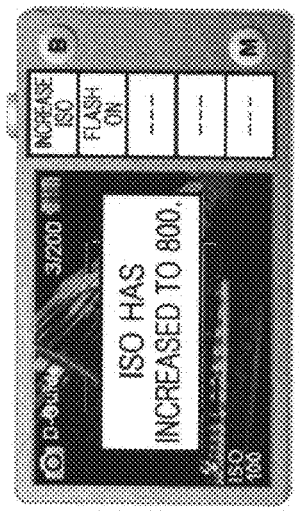

In this case, when the user half presses the shutter button 520, the error detector 142 detects an error belonging to the hardware condition or the software condition. If the error detector 142 detects the error "insufficient exposure", as shown in FIG. 8(b), the D-buttons 540 to 544 may display solution images indicating "increase ISO" and "flash ON". Although the detected error described with reference to FIGS. 7A through 7D is the same as that of FIGS. 8A through 8F, the condition of the terminal 510 of FIGS. 7A through 7D may differ from the terminal 510 of FIGS. 8A through 8F. Therefore, as shown in FIGS. 7 and 8, different solution images may be displayed.

Thereafter, when the user manipulates the D-button 540 to select a solution image indicating "increase ISO," the manipulated D-button 540 displays the blinking solution image indicating "increase ISO."

Figure 8C:
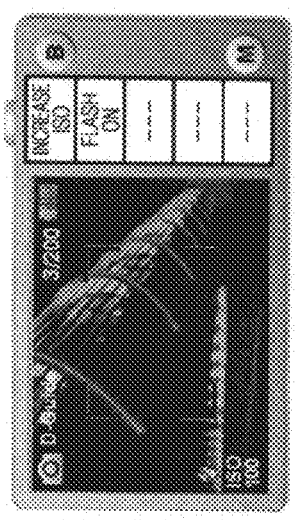

In this case, the terminal 510 automatically increases ISO to a predetermined value, and the LCD panel 530 displays a message indicating "ISO has increased to 800." as shown in FIG. 8C. Subsequently, a solution indicated by the selected solution image ("increase ISO") is performed, and then the solution image indicating "increase ISO" stops blinking. Herein, the value 800 is presented as an example for convenience of description.

Figure 8D:
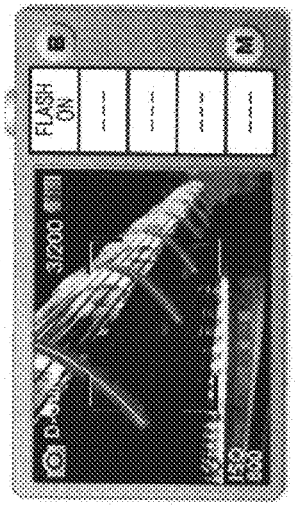

After the solution indicated by the selected solution image ("increase ISO") is completely performed, the error detector 142 determines whether the detected error has been removed. If the detected error has not been removed, the D-buttons no longer indicate the previously selected solution image ("increase ISO"). Instead, another solution image ("flash ON") may be displayed as shown in FIG. 8D rather than the previously selected solution image. Preferably, the location of the solution image changes. For example, a solution image indicating "flash ON" is displayed on the D-button 542 in FIG. 8B and displayed on the D-button 540 in FIG. 8D.

Thereafter, when the user selects the solution image indicating "flash ON" by manipulating the D-button 540, the manipulated D-button 540 displays the blinking solution image indicating "flash ON."

Figure 8E:
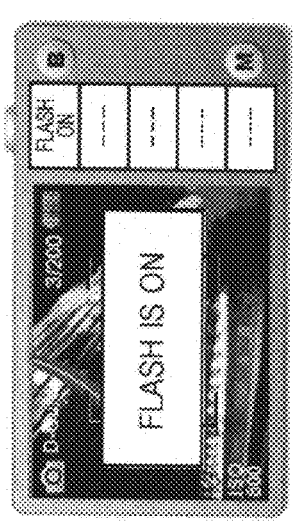

In this case, the terminal 510 automatically turns on the flash. When a solution indicated by the selected solution image ("flash ON") is completely performed, the LCD panel 530 displays a message indicating "The flash is ON." as shown in FIG. 8E and stops displaying the blinking solution image indicating "flash ON."

Figure 8F:
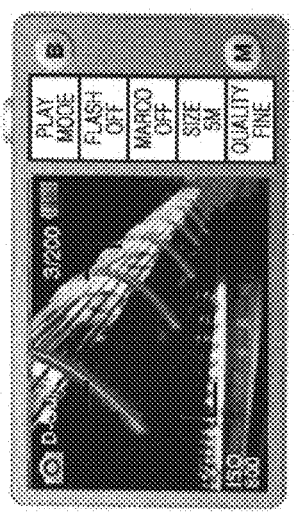

As such, when the solution indicated by the selected solution image ("flash ON") is completely performed, the error detector 142 re-determines whether the detected error has been removed. "Whether the detected error has been removed by turning on the flash" can be known only when a photo is taken in practice. Therefore, the error detector 142 can operate again only when the user fully presses the shutter button 520 after checking the message indicating "The flash is ON." The photo may be displayed on the LCD panel 530 as shown in FIG. 8F. Accordingly, the user can visually check "whether the detected error has been removed by turning on the flash."

FIGS. 9A through 9D illustrate views when an error of "unable to focus" occurs.

Figure 9C:
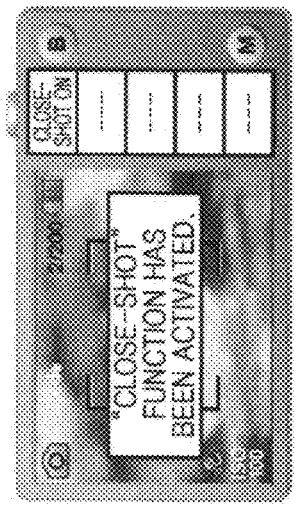
Figure 9B:
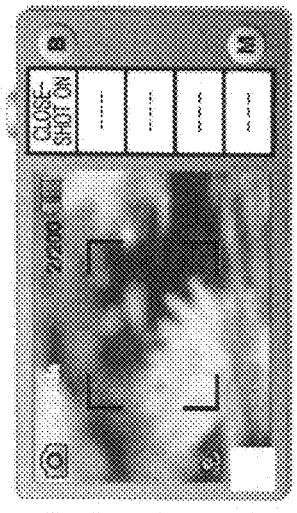
Figure 9A:
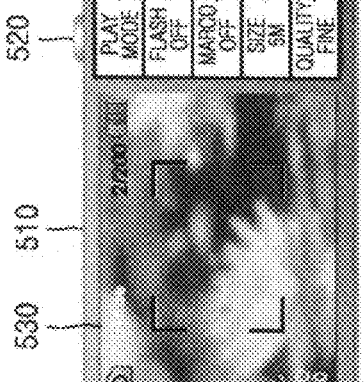

Referring to FIG. 9A, the LCD panel 530 displays a photographic image, and the D-buttons 540 to 548 display regular images (i.e., "play mode", "flash OFF", "macro OFF", "size 5 m", and "quality fine").

In this case, when the user half presses the shutter button 520, the error detector 142 detects an error belonging to the hardware condition or the software condition. If the error detector 142 detects the error "unable to focus", as shown in FIG. 9B, the D-button 540 may display a solution image indicating "close-shot ON".

Some examples of a possible solution for the error of "unable to focus" include: "set a close-shot function to ON"; "turn on an AF assist light"; "locate the subject within a focal area"; and "check whether an AF assist light is blocked by a finger, and if so, remove the finger away from the AF assist light." Nevertheless, referring to FIG. 9B, the D-buttons display only one solution image ("close-shot ON"). This is because, in FIG. 9A, the AF assist light of the terminal 510 has already been ON, the subject has already been within the focal area, the AF assist light is not blocked by something, and the close-shot function is set to OFF.

When the user selects a solution image indicating "close-shot ON" by manipulating the D-button 540, the manipulated D-button 540 displays the blinking solution image indicating "close-shot ON."

In this case, the terminal 510 automatically turns on the close-shot function, and the LCD panel 530 displays a message indicating "The close-shot function has been activated." as shown in FIG. 9C. Accordingly, when a solution ("set a close-shot function to ON") indicated by the selected solution image ("close-shot ON") is completely performed, the solution image indicating "close-shot ON" stops blinking.

Figure 9D:
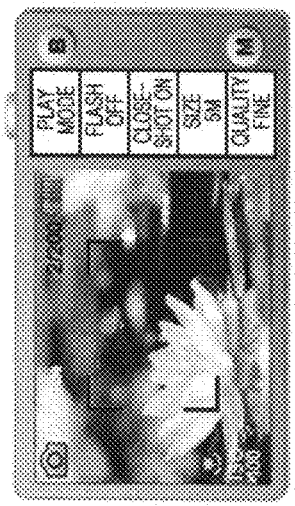

After the solution indicated by the selected solution image ("close-shot ON") is completely performed, the error detector 142 determines whether the detected error has been removed. If the detected error has been removed, the D-buttons 540 to 548 re-display the regular images as shown in FIG. 9D. Preferably, the user fully presses the shutter button 520 in this state to take a photo.

FIGS. 10A through 10D illustrate views when an error of "abnormal exposure" occurs.

Figure 10C:
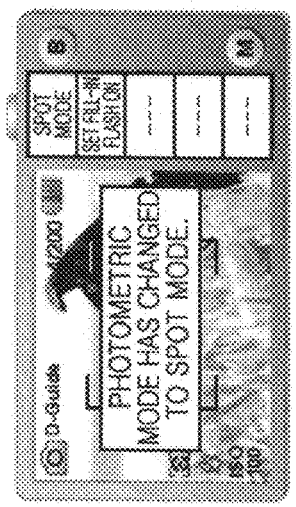
Figure 10B:
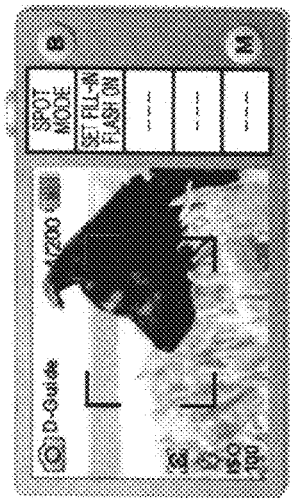
Figure 10A:
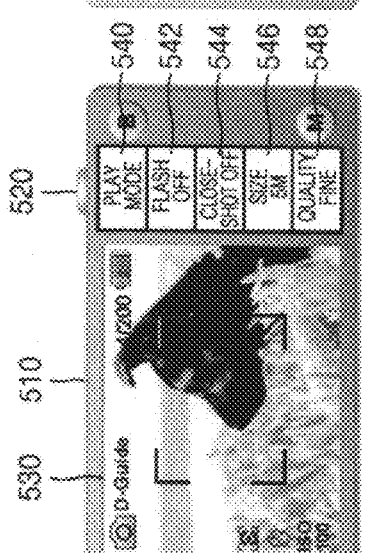

Referring to FIG. 10A, the LCD panel 530 displays a photographic image, and the D-buttons 540 to 548 display regular images (i.e., "play mode", "flash OFF", "macro OFF", "size 5 m", and "quality fine").

In this case, when the user half presses the shutter button 520, the error detector 142 detects an error belonging to the hardware condition or the software condition. If the error detector 142 detects the error of "abnormal exposure", as shown in FIG. 10B, the D-buttons 540 and 542 may display solution images indicating "set spot mode" and "set fill-in flash ON".

Thereafter, when the user manipulates the D-button 540 to select a solution image indicating "set spot mode", the manipulated D-button 540 displays the blinking solution image indicating "set spot mode".

In this case, the terminal 510 automatically sets its photometric mode to the spot mode, and the LCD panel 530 displays a message indicating "Photometric mode has changed to spot mode." as shown in FIG. 10C. Subsequently, a solution ("set a photometric mode to a spot mode") indicated by the selected solution image ("set spot mode") is performed, and then the solution image indicating "set spot mode" stops blinking.

Figure 10D:
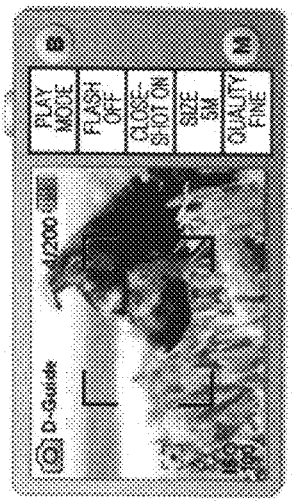

After the solution indicated by the selected solution image ("set spot mode") is completely performed, the error detector 142 determines whether the detected error has been removed. If the detected error has been removed, the D-buttons 540 to 548 re-display the regular images as shown in FIG. 10D. Preferably, the user fully presses the shutter button 520 in this state to take a photo.

FIG. 11 is a flowchart of a display method according to an exemplary embodiment. Operations 1110 to 1132 are performed in which an error occurring in a terminal having a camera function is detected, and one or more solutions for removing the detected error are displayed to a user.

The user half presses a shutter button so that the terminal performs a half-shutter function (operation 1110). The controller 140 determines whether an error occurs in the terminal, and if the error belongs to a hardware condition or a software condition (operation 1112).

If the error is detected in operation 1112, the controller 140 reads one or more solution images corresponding to the error detected in operation 1112 from a plurality of solution images stored in the storage unit 150 (operation 1114).

After operation 1114 is performed, the one or more solution images read in operation 1114 are displayed on one or more D-buttons (operation 1116). The user selects one solution image from the one or more solution images displayed in operation 1116 (operation 1118).

After operation 1118 is performed, the controller 140 determines whether the error detected in operation 1112 belongs to the hardware condition or the software condition (operation 1120).

If the error belongs to the hardware error in operation 1120, the main display 120 displays a solution indicated by the solution image selected in operation 1118 in the format of a message (operation 1122). The user property operates the terminal according to the solution displayed in operation 1122 (operation 1124).

On the other hand, if the error belongs to the software error in operation 1120, the main display 120 displays a solution indicated by the solution image selected in operation 1118 in the format of a message (operation 1126). The terminal automatically performs the solution displayed in operation 1122 (operation 1128). Although operation 1128 is followed by operation 1126 in FIG. 11, operation 1128 may be performed along with operation 1126 or prior to operation 1126.

After operation 1124 or 1128 is performed, the controller 140 determines whether the error detected in operation 1112 has been removed (operation 1130).

If it is determined in operation 1130 that the error was removed, the D-buttons display regular images, and the user takes a photo only after checking whether an image displayed on the D-button has changed from the solution image to the regular images (operation 1132).

On the other hand, if the determination result in operation 1130 shows that the error was not removed, the procedure proceeds to operation 1118. Meanwhile, if the error is not detected in operation 1112, the procedure proceeds to operation 1132.

Accordingly to exemplary embodiments, when an error occurring in a terminal is detected, one or more solutions for removing the detected error are displayed to a user, so that the detected error can be easily removed by the user even though he/she is not familiar with operations or detailed functions of the camera. This advantage cannot be expected in the conventional camera in which, when an error occurs in the camera, a user is simply informed of error occurrence, which is of no use if the user is not familiar with the operations and detailed functions of the camera.

Furthermore, when a plurality of solutions are to be displayed to remove the detected error, a solution image corresponding to a cause of the detected error, the cause having the highest probability among all possible causes according to experimental results, is displayed at a position which is expected to be first noticed by the user, while a solution image corresponding to a cause of the detected error, the cause having the lowest probability, is displayed at a position which is expected to be lastly noticed by the user. Therefore, a time for removing the detected error can be significantly reduced.

Likewise, when a plurality of solutions are to be displayed to remove the detected error, a solution image indicating a solution, wherein the solution can remove the detected error the most effectively according to experimental results, is displayed at a position which is expected to be first noticed by the user, while a solution image indicating a solution, wherein the solution can remove the detected error the least effectively, is displayed at a position which is expected to be last noticed by the user. Therefore, a time for removing the detected error can be significantly reduced.

In addition, when the detected error belongs to a software condition of the terminal, the terminal automatically performs a solution selected by the user from the displayed solutions. Therefore, the user does not have to manually operate the terminal to remove the error. Accordingly, there is an advantage in that the detected error can be rapidly removed.

In addition to the above-described exemplary embodiments, exemplary embodiments of can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of implementing embodiments, or they may be of the kind well-known and available to those skilled in the art of computer hardware and/or computer software.

Although a few exemplary embodiments have been shown and described, it would be appreciated by those skilled in the art that changes may be made in these exemplary embodiments, the scope of which is defined in the claims and their equivalents.

What is claimed is:

1. A device having a camera function and a main display to display a photographic image, comprising:
    a controller to detect error which causes abnormal operation of the camera function by analyzing at least one of software and hardware condition of the device and to provide one or more solution images corresponding to the detected error; and
    a plurality of buttons to display the one or more solution images,
    wherein each of the plurality of buttons includes a sub-display to display one of provided solution images on the each of the plurality of buttons.

2. The device of claim 1, wherein the controller provides the one or more solution images corresponding to the detected error, wherein the provided one or more solution images are selected from predetermined solution images.

3. The device of claim 1, further comprising a solution information storage to store a plurality of pieces of solution information to addresses corresponding to possible errors,
    wherein the controller reads one or more pieces of solution information having address corresponding to the detected error from the plurality of pieces of solution information stored, and
    wherein the plurality of buttons display the one or more solution images indicated by the read solution information.

4. The device of claim 1, wherein the controller provides the solution images matched to the causes of error occurrence corresponding to the device among one or more causes of error occurrence pre-defined for the detected error.

5. The device of claim 1, further comprising:
    a cause information storage to store one or more pieces of cause information to the addresses corresponding to the possible errors; and
    a solution information storage which stores solution information to addresses of the possible cause information,
    wherein the controller determines whether one or more cause information having the address of the detected error are respectively corresponds to the device and transmits solution information, which has an address of the cause information determined to be corresponds to the device, to the plurality of buttons.

6. The device of claim 1, wherein the detected error is one of a plurality of possible pre-defined errors.

7. The device of claim 1, wherein the main display displays solution indicated by solution image displayed on one of buttons in response to manipulation of the one button.

8. The device of claim 1, wherein the device automatically performs the solution indicated by the solution image displayed on one of buttons in response to manipulation of the one button.

9. The device of claim 1, wherein the solution image displayed on one of the buttons blinks in response to manipulation of the one button.

10. The device of claim 1, wherein the plurality of solution images are displayed on the plurality of buttons by being arranged according to a pre-defined order.

11. The device of claim 1, wherein the controller and the plurality of buttons operate only when the device performs a half-shutter function.

12. The device of claim 1, wherein the controller generates a control signal for solution to be performed in response to manipulation of one of the plurality of buttons, and the solution corresponds to one of provided solution images.

13. A device having a camera function and a main display to display a photographic image, comprising:
    a controller to detect error which causes abnormal operation of the camera function by analyzing at least one of software and hardware condition of the device and to provide one or more solution images corresponding to the detected error; and
    a sub-display to display the provided solution images,
    wherein the controller generates a control signal for solution to be performed in response to manipulation of the sub-display, and the solution corresponds to one of provided solution images.

14. A display method performed in a device having a camera function, and a main display to display a photographic image and a plurality of buttons, comprising:
    (a) detecting error which is caused by abnormal operation of the camera function by analyzing at least one of software and hardware condition of the device; and
    (b) displaying one or more solution images corresponding to the detected error on the plurality of buttons,
    wherein each of the plurality of buttons includes a sub-display to display one of the solution images.

15. The display method of claim 14, further comprising generating a control signal for solution to be performed in response to manipulation of one of the plurality of buttons, and the solution corresponds to one of the solution images.

16. The display method of claim 14, wherein, in (b), the one or more solution images corresponding to the detected error are displayed, wherein the displayed solution images are selected from predetermined solution images.

17. The display method of claim 14, wherein (b) comprises:
    (b1) reading solution information matched to the detected error from stored solution information which is matched to all possible errors; and
    (b2) displaying one or more solution images indicated by the read solution information on the plurality of buttons.

18. The display method of claim 14, wherein, in (b), the solution images matched to the causes of error occurrence corresponding to the device from among one or more causes of error occurrence pre-defined for the detected error are displayed.

19. The display method of claim 14, wherein the detected error is one of a plurality of pre-defined possible errors.

20. The display method of claim 14, further comprising displaying a solution indicated by a solution image displayed on one of the buttons in response to manipulation of the one button.

21. The display method of claim 14, wherein the device automatically performs the solution indicated by the solution image displayed on one of the buttons in response to manipulation of the one button.

22. The display method of claim 14, wherein the solution image displayed on one of the buttons manipulated blinks in response to manipulation of the one button.

23. The display method of claim 14, wherein, in (b), a plurality of solution images are displayed on the plurality of buttons by being arranged according to a pre-defined order.

24. The display method of claim 14, wherein the display method is performed only when the device performs a half-shutter function.

25. A display method performed in a device having a camera function and a main display to display a photographic image, comprising:

(a) detecting error which is caused by abnormal operation of the camera function by analyzing at least one of software and hardware condition of the device;

(b) displaying on a sub-display one or more solution images corresponding to the detected error; and (c) generating a control signal for solution to be performed in response to manipulation of the sub-display, and the solution corresponds to one of the solution images.

26. At least one non-transitory computer readable medium storing computer readable instructions that control at least one processor to implement the method of claim 14.

27. At least one non-transitory computer readable medium storing computer readable instructions that control at least one processor to implement the method of claim 25.

* * * * *